United States Patent
Tan et al.

(10) Patent No.: US 10,982,041 B2
(45) Date of Patent: Apr. 20, 2021

(54) EPOXY RESIN OLIGOMER

(71) Applicant: SWANCOR ADVANCED MATERIALS Co., Ltd., Shanghai (CN)

(72) Inventors: Kok-Sheng Tan, Nantou County (TW); Chen-Han Chien, Nantou County (TW); Yu-Tsan Tseng, Nantou County (TW)

(73) Assignee: SWANCOR ADVANCED MATERIALS Co., Ltd., Shanghai (CN)

( * ) Notice: Subject to any disclaimer, the term of this patent is extended or adjusted under 35 U.S.C. 154(b) by 570 days.

(21) Appl. No.: 15/052,888

(22) Filed: Feb. 25, 2016

(65) Prior Publication Data
US 2017/0247500 A1    Aug. 31, 2017

(51) Int. Cl.
    *C08G 59/14*      (2006.01)
    *C08G 59/06*      (2006.01)
    *C08K 7/06*      (2006.01)

(52) U.S. Cl.
CPC ....... *C08G 59/1477* (2013.01); *C08G 59/066* (2013.01); *C08K 7/06* (2013.01)

(58) Field of Classification Search
CPC ................................................ C08G 59/1477
See application file for complete search history.

(56) References Cited

U.S. PATENT DOCUMENTS

| | | | |
|---|---|---|---|
| 6,656,316 B1 | 12/2003 | Dyksterhouse | |
| 2010/0056671 A1* | 3/2010 | Dershem | C08G 59/3209 523/400 |
| 2010/0272920 A1* | 10/2010 | Garnett | B05D 3/067 427/551 |
| 2011/0288259 A1* | 11/2011 | Tsujimura | C08G 59/621 528/93 |
| 2012/0225982 A1* | 9/2012 | Ravichandran | C08K 5/0091 524/196 |
| 2013/0160841 A1* | 6/2013 | Kawakami | H05K 3/323 136/256 |
| 2013/0288058 A1* | 10/2013 | Hong | C09J 5/00 428/414 |
| 2014/0228471 A1* | 8/2014 | Jurek | C08G 63/672 522/170 |
| 2014/0275311 A1* | 9/2014 | Marks | C08G 18/73 521/164 |
| 2014/0275342 A1* | 9/2014 | Guo | C08G 59/1438 523/400 |
| 2014/0275343 A1* | 9/2014 | Hefner, Jr. | C08G 59/1477 523/427 |
| 2015/0210673 A1* | 7/2015 | Roberts | C07D 413/14 514/210.2 |
| 2015/0275031 A1* | 10/2015 | Lang | C09D 5/185 523/451 |
| 2017/0096577 A1* | 4/2017 | Abrami | C09D 163/00 |
| 2017/0247518 A1* | 8/2017 | Tan | C08J 5/24 |
| 2018/0056449 A1* | 3/2018 | Zhu | B23K 35/025 |
| 2018/0251642 A1* | 9/2018 | Van Meulder | C09D 11/08 |

FOREIGN PATENT DOCUMENTS

| | | |
|---|---|---|
| CN | 1682149 | 10/2005 |
| CN | 104045808 | 9/2014 |
| TW | 200835712 | 9/2008 |

OTHER PUBLICATIONS

"Office Action of Taiwan Counterpart Application", dated Sep. 10, 2016, p. 1-p. 5.
"Office Action of China Counterpart Application," dated Aug. 16, 2018, pp. 1-7.

* cited by examiner

*Primary Examiner* — Megan McCulley
(74) *Attorney, Agent, or Firm* — JCIPRNET

(57) ABSTRACT

An epoxy resin oligomer is provided. The epoxy resin oligomer is obtained by the reaction of at least a first reactant and a second reactant, and the molecular weight of the epoxy resin oligomer is between 3000 and 9000, wherein the mole ratio of the first reactant and the second reactant is between 1:0.9 and 0.9:1, and each of the first reactant and the second reactant is a compound having two polymerizable groups.

16 Claims, No Drawings

EPOXY RESIN OLIGOMER

BACKGROUND OF THE INVENTION

Field of the Invention

The invention relates to an oligomer, and more particularly, to an epoxy resin oligomer.

Description of Related Art

Due to the vigorous development of technology, the impact on the environment is getting worse, and energy saving and recycling have become important topics.

In recent years, lightweight composite materials used to replace metal materials have become new energy materials receiving much attention. In general, composite materials can be divided into theiliiosetting composite materials or thermoplastic composite materials due to the different resins used therein. Although thermosetting composite materials have very good mechanical properties and high chemical resistance, and sophisticated processing techniques are already available on the market, the disadvantage of negative impact on the environment exists since the resulting finished product cannot be recycled and secondary processing cannot be performed on it. As a result, environmental awareness currently becoming more important all over the world is compromised.

Accordingly, the development of a thermoplastic composite material similarly having high mechanical properties and for which the finished product has recyclability has received much attention. Currently, the biggest difficulty in the development of a thermoplastic composite material is that the resin cannot be effectively impregnated with fiber. To solve the issue, currently industries have three solutions: hotmelt impregnation, solvent impregnation, and in-situ polymerization, wherein in-situ polymerization has more potential, because this method not only has the advantages of good impregnation effect and low energy consumption, but can also be used in different molding techniques such as prepreg, vacuum-assisted resin transfer molding (VARTM), a pultrusion method, or a wounding method. However, in-situ polymerization still has the disadvantages of, for instance, difficulty in the control of molecular weight distribution, less stable mechanical properties of products, and high volatility and stench generation of polymer precursor.

SUMMARY OF THE INVENTION

Accordingly, the invention provides an epoxy resin oligomer having reactivity and capable of achieving good impregnation effect at a lower impregnation temperature when applied in in-situ polymerization, thus solving the issue of difficult control of molecular weight distribution and preventing the generation of stench in the manufacture.

The epoxy resin oligomer of the invention is obtained by the reaction of at least a first reactant and a second reactant, and the molecular weight of the epoxy resin oligomer is between 3000 and 9000, wherein the mole ratio of the first reactant and the second reactant is between 1:0.9 and 0.9:1, and each of the first reactant and the second reactant is a compound having two polymerizable groups.

Based on the above, the epoxy resin oligomer provided by the invention is obtained by the reaction of at least a first reactant and a second reactant, and the molecular weight of the epoxy resin oligomer is between 3000 and 9000, wherein the mole ratio of the first reactant and the second reactant is between 1:0.9 and 0.9:1, and each of the first reactant and the second reactant is a compound having two polymerizable groups. As a result, the epoxy resin oligomer has reactivity, and is capable of achieving good impregnation effect at a lower impregnation temperature when applied in in-situ polymerization, thus solving the issue of difficult control of molecular weight distribution and preventing the generation of stench in the manufacture.

To make the above features and advantages of the invention more comprehensible, several embodiments are described in detail as follows.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with any numerical value and the smaller numerical range in the specification.

Moreover, in the present specification, if it is not particularly specified whether a group is substituted, then the group can represent a substituted or an unsubstituted group. For instance, "alkyl group" can represent a substituted or an unsubstituted alkyl group. In addition, when a particular group is described with "CX", it means that the main chain of the group has X number of carbon atoms.

Moreover, in the present specification, skeleton formulas are sometimes used to represent compound structures. Such representation can omit carbon atoms, hydrogen atoms, and carbon-hydrogen bonds. Of course, structural formulas with clear illustrations of functional groups are definitive.

To prepare an epoxy resin oligomer having reactivity and suitable for application in in-situ polymerization and used as a polymerization precursor, the invention provides an epoxy resin oligomer capable of achieving the above advantages. Specifically, the epoxy resin oligomer is obtained by the reaction of at least a first reactant and a second reactant, and the molecular weight of the epoxy resin oligomer is between 3000 and 9000, wherein the mole ratio of the first reactant and the second reactant is between 1:0.9 and 0.9:1, and each of the first reactant and the second reactant is a compound having two polymerizable groups. In the following, embodiments are provided to describe the epoxy resin oligomer of the invention in detail as examples of actual implementation of the invention.

The first embodiment of the invention provides an epoxy resin oligomer.

The epoxy oligomer is obtained by the reaction of at least a first reactant and a second reactant, and the molecular weight of the epoxy resin oligomer is between 3000 and 9000, wherein the mole ratio of the first reactant and the second reactant is between 1:0.9 and 0.9:1, preferably 1:1, and each of the first reactant and the second reactant is a compound having two polymerizable groups. In other words, in the present embodiment, the composition used to form the epoxy resin oligomer at least includes the first reactant and the second reactant.

Specifically, in the present embodiment, the first reactant is a bifunctional epoxy resin, and the second reactant is an amine compound containing dual active hydrogen. In other words, in the present embodiment, the polymerizable groups of the first reactant and the second reactant are respectively an epoxy group and an amine group with single active hydrogen.

More specifically, in the present embodiment, the first reactant is the bifunctional epoxy resin and the second reactant is the amine compound containing dual active hydrogen, and therefore the epoxy group in the first reactant and the active hydrogen in the second reactant are reacted in an addition polymerization reaction to form a strip-shaped epoxy resin oligomer. Moreover, in the present embodiment, the epoxy resin oligomer is a thermoplastic epoxy resin oligomer.

Specifically, in the present embodiment, the first reactant is selected from at least one of the compounds represented by formula (1) to formula (4) below:

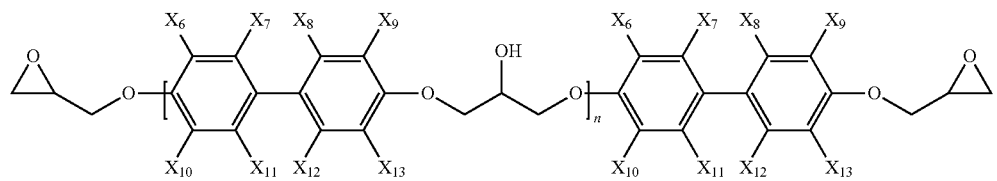

formula (1)

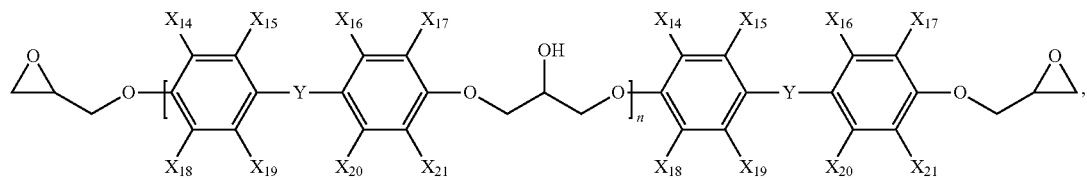

formula (2)

formula (3)

formula (4)

wherein $X_1$ is a C4 to C18 alkylene group; $X_2$ to $X_{21}$ are each independently a hydrogen atom, a phosphorus atom, a C1 to C18 alkyl group, or halogen; Y is a sulfur atom, an oxygen atom, or a carbon atom; and n is 0 to 20. In other words, in the present embodiment, the first reactant can adopt a single bifunctional epoxy resin or a plurality of bifunctional epoxy resins.

Moreover, the first reactant can also adopt commercial product. Examples of commercial product suitable as the first reactant include: BE-188 (made by Changchun Chemical Company), NPEB-310 (made by Nanya Plastics Corporation), or 1,4BDGE (made by KUKDO Chemical Co., LTD). Moreover, in the present embodiment, the epoxy equivalent of the first reactant is between 150 g/mol and 1000 g/mol, for example.

Moreover, in the present embodiment, the second reactant is selected from at least one of the compounds represented by formula (5) to formula (7) below:

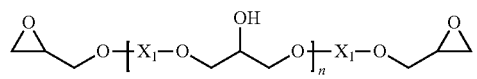

formula (5)

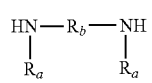

formula (6)

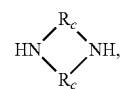

formula (7)

wherein $R_a$ is a C1 to C20 alkyl group, a C5 to C12 cycloalkyl group, a C6 to C18 aryl group, or a C6 to C20 aralkyl group; $R_b$ is a C1 to C20 alkylene group or a C6 to C12 arylene group; and $R_c$ is a C1 to C20 alkylene group. In other words, in the present embodiment, the second reactant can adopt a single amine compound containing dual active hydrogen or a plurality of amine compounds containing dual active hydrogen. Moreover, in the present embodiment, the second reactant is used as a hardener.

Moreover, in the present embodiment, the first reactant is at least one selected from the compounds represented by formula (1) to formula (4) above and the second reactant is at least one selected from the compounds represented by formula (5) to formula (7) above, and therefore the epoxy resin oligomer can be formed without a solvent. Specifically, in the present embodiment, the first reactant is a liquid or is a solid but become a paste-like substance (i.e. a liquid with high viscosity) after heating and adding a curing agent, and the second reactant is a liquid or a solid, preferably a liquid. In other words, in the present embodiment, regardless of whether the second reactant is a liquid or a solid, by using a liquid epoxy resin for the first reactant, the epoxy resin oligomer can be obtained without the addition of a solvent. In this way, in the present embodiment, an organic solvent harmful to the environment does not need to be used during the preparation of the epoxy resin oligomer, and therefore environmental-friendliness is achieved.

Moreover, in an embodiment, the first reactant and the second reactant may be reacted at room temperature. As a result, in comparison to a known method in which a polymer is directly grown from monomers at high temperature (generally 100° C. to 160° C.), during the preparation process of the epoxy resin oligomer of the present embodiment, the amine compound containing dual active hydrogen and having volatility is less readily volatilized, such that the manufacture is cleaner, odorless, and environmentally friendly. Moreover, since the epoxy resin oligomer does not contain a low molecular compound having volatility any longer, even if a polymerization reaction is performed on the epoxy resin oligomer again at high temperature, stench is still not generated in the manufacture. In other words, the generation of stench can be prevented during the preparation process and the application process of the epoxy resin oligomer of the present embodiment.

Moreover, in the present embodiment, the epoxy resin oligomer is a solid at room temperature. In other words, in the present embodiment, the ongoing reaction between the first reactant and the second reactant is stopped when the epoxy resin oligomer is changed into a solid. The reason is that, the first reactant and the second reactant may be reacted at room temperature, as described above. More specifically, in the present embodiment, since the mole ratio of the first reactant and the second reactant is between 1:0.9 and 0.9:1, when the reaction between the first reactant and the second reactant is stopped when the epoxy resin oligomer is changed into a solid, a polymerizable group still exists in the epoxy resin oligomer. It can be known from the above that, in the present embodiment, at room temperature, the epoxy resin oligomer is a solid epoxy resin oligomer having reactivity and a molecular weight between 3000 and 9000. Moreover, since the epoxy resin oligomer of the present embodiment is a solid at room temperature, the epoxy resin oligomer of the present embodiment has good retentivity.

Moreover, in the present embodiment, the composition used to form the epoxy resin oligomer can further include an additive as needed. In other words, the epoxy resin oligomer can be obtained by performing a reaction on at least the first reactant, the second reactant, and the additive. Specifically, in the present embodiment, based on the total weight of the first reactant, the second reactant, and the additive, the usage amount of the additive is, for instance, greater than 0 wt % and equal to or less than 5 wt %. Moreover, the additive includes, for instance, a UV-resistant agent, an anti-yellowing agent, a flame retardant, a toughener, a plasticizer, or an abrasion-resistant additive. Moreover, in the present embodiment, the composition used to form the epoxy resin oligomer can also not include an additive.

The second embodiment of the invention also provides an epoxy resin oligomer. The epoxy resin oligomer is obtained by performing a reaction on at least a first reactant and a second reactant, and the molecular weight of the epoxy resin oligomer is between 3000 and 9000, wherein the mole ratio of the first reactant and the second reactant is between 1:0.9 and 0.9:1, preferably 1:1, and each of the first reactant and the second reactant is a compound having two polymerizable groups. In other words, in the present embodiment, the composition used to form the epoxy resin oligomer at least includes the first reactant and the second reactant.

Specifically, in the present embodiment, the first reactant is a bifunctional epoxy resin, and the second reactant is a bisphenol compound. In other words, in the present embodiment, the polymerizable groups of the first reactant and the second reactant are respectively an epoxy group and a hydroxyl group.

More specifically, in the present embodiment, the first reactant is a bifunctional epoxy resin and the second reactant is a bisphenol compound, and therefore the epoxy group in the first reactant and the hydroxyl group in the second reactant are reacted in an addition polymerization reaction to form a strip-shaped epoxy resin oligomer. Moreover, in the present embodiment, the epoxy resin oligomer is a thermoplastic epoxy resin oligomer.

Specifically, in the present embodiment, the first reactant is selected from at least one of the compounds represented by formula (1) to formula (4) below:

formula (1)

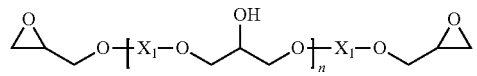

formula (2)

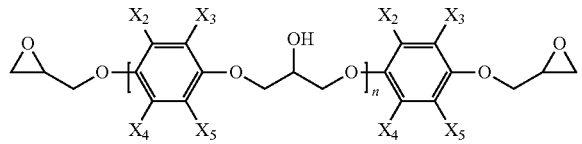

formula (3)

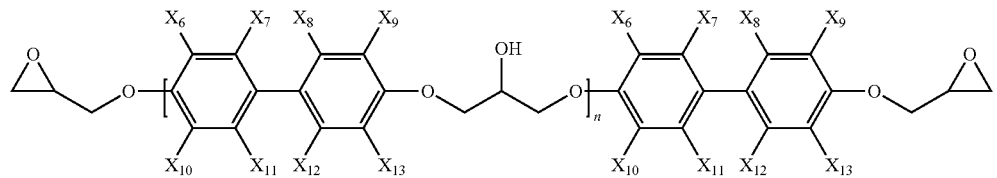

formula (4)

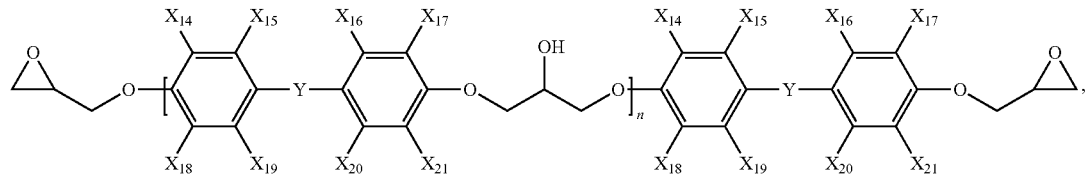

wherein $X_1$ is a C4 to C18 alkylene group; $X_2$ to $X_{21}$ are each independently a hydrogen atom, a phosphorus atom, a C1 to C18 alkyl group, or halogen; Y is a sulfur atom, an oxygen atom, or a carbon atom; and n is 0 to 20. In other words, in the present embodiment, the first reactant can adopt a single bifunctional epoxy resin or a plurality of bifunctional epoxy resins.

Moreover, the first reactant can also adopt commercial product. Examples of commercial product suitable as the first reactant include: BE-188 (made by Changchun Chemical Company), NPEB-310 (made by Nanya Plastics Corporation), or 1,4BDGE (made by KUKDO Chemical Co., LTD). Moreover, in the present embodiment, the epoxy equivalent of the first reactant is between 150 g/mol and 1000 g/mol, for example.

Moreover, in the present embodiment, the second reactant is selected from at least one of the compounds represented by formula (8) to formula (9) below:

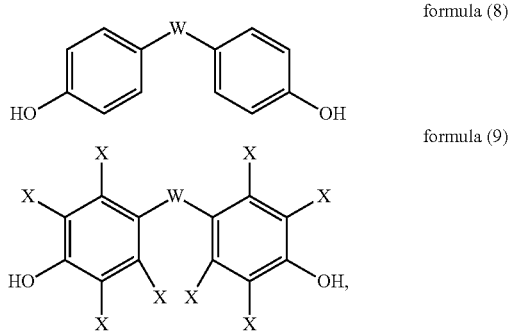

formula (8)

formula (9)

wherein W is a C1 to C20 alkylene group, a C5 to C12 cycloalkylene group, or a fluorenylene group, and X is a C1 to C20 alkyl group, a hydrogen atom, or halogen. In other words, in the present embodiment, the second reactant can adopt a single bisphenol compound or a plurality of bisphenol compounds. Moreover, in the present embodiment, the second reactant is used as a chain extender.

Moreover, in the present embodiment, the first reactant is at least one selected from the compounds represented by formula (1) to formula (4) above and the second reactant is at least one selected from the compounds represented by formula (8) to formula (9) above, and therefore the epoxy resin oligomer can be formed without a solvent. Specifically, in the present embodiment, the first reactant is a liquid or is a solid but become a paste-like substance (i.e. a liquid with high viscosity) after heating and adding a curing agent, and the second reactant is a liquid or a solid, preferably a liquid. In other words, in the present embodiment, regardless of whether the second reactant is a liquid or a solid, by using a liquid epoxy resin for the first reactant, the epoxy resin oligomer can be obtained without the addition of a solvent. In this way, in the present embodiment, an organic solvent harmful to the environment does not need to be used during the preparation of the epoxy resin oligomer, and therefore environmental-friendliness is achieved.

Moreover, in an embodiment, the first reactant and the second reactant may be reacted at a temperature between 60° C. and 120° C. As a result, in comparison to a known method in which a polymer is directly grown from monomers at high temperature (generally 100° C. to 160° C.), during the preparation process of the epoxy resin oligomer of the present embodiment, the bisphenol compound having volatility is less readily volatilized, such that the manufacture is cleaner, odorless, and environmentally friendly. Moreover, since the epoxy resin oligomer does not contain a low molecular compound having volatility any longer, even if a polymerization reaction is performed on the epoxy resin oligomer again at high temperature, stench is still not generated in the manufacture. In other words, the generation of stench can be prevented during the preparation process and the application process of the epoxy resin oligomer of the present embodiment.

Moreover, in the present embodiment, the epoxy resin oligomer is a solid at room temperature. In other words, the epoxy resin oligomer of the present embodiment has good retentivity. Moreover, as described above, in the present embodiment, the first reactant and the second reactant may be reacted at a temperature between 60° C. and 120° C., and therefore during the reaction, the process temperature can be lowered to room temperature to obtain a solid epoxy resin oligomer. It should be mentioned that, when the epoxy resin oligomer is changed into a solid, the ongoing reaction between the first reactant and the second reactant is stopped. More specifically, in the present embodiment, since the mole ratio of the first reactant and the second reactant is between 1:0.9 and 0.9:1, when the reaction between the first reactant and the second reactant is stopped, a polymerizable group still exists in the epoxy resin oligomer. It can be known from the above that, in the present embodiment, at room temperature, the epoxy resin oligomer is a solid epoxy resin oligomer having reactivity and a molecular weight between 3000 and 9000.

Moreover, in the present embodiment, from the perspective of facilitating reactivity, the composition used to form the epoxy resin oligomer can further include a catalyst. In other words, the epoxy resin oligomer can be obtained by performing a reaction on at least the first reactant, the second reactant, and the catalyst. Specifically, in the present embodiment, based on the total weight of the first reactant, the second reactant, and the catalyst, the usage amount of the catalyst is 0.01 wt % to 3 wt %. Moreover, the catalyst includes, for instance, a Lewis base or an organic base, wherein the Lewis base can include, for instance: tributyl phosphate, triphenyl phosphate, or triethylammonium biscarbonate, and the organic base can include, for instance: tetramethylammonium hydroxide, phosphazene, or pyridine.

Moreover, in the present embodiment, in the case that the composition used to form the epoxy resin oligomer includes a catalyst, the composition can further include an additive as needed. In other words, the epoxy resin oligomer can be obtained by performing a reaction on at least the first reactant, the second reactant, the catalyst, and the additive. Specifically, in the present embodiment, based on the total weight of the first reactant, the second reactant, the catalyst, and the additive, the usage amount of the additive is greater than 0 wt % and equal to or less than 5 wt %. Moreover, the additive includes, for instance, a UV-resistant agent, an anti-yellowing agent, a flame retardant, a toughener, a plasticizer, or an abrasion-resistant additive. Moreover, in the present embodiment, the composition used to form the epoxy resin oligomer can also not include an additive.

It should be mentioned that, as described above, the epoxy resin oligomer of any of the above embodiments is a solid epoxy resin oligomer having reactivity and a molecular weight between 3000 and 9000 at room temperature, such that the epoxy resin oligomer is suitable for in-situ polymerization, and can be used in different molding techniques, such as prepreg, a hot compression molding method, vacuum-assisted resin transfer molding (VARTM), a pultrusion method, or a wounding method. Specifically, since the molecular weight (i.e., 3000 to 9000) of the epoxy resin oligomer is between that of the reactive monomer and the polymer, the viscosity thereof is significantly reduced by performing heating without having to use a very high temperature, wherein the heating temperature is, for instance, 100° C. to 160° C. In this way, when in-situ polymerization is performed, the epoxy resin oligomer can be effectively impregnated in the fiber, such that the resulting composite material has good mechanical strength.

Moreover, in an embodiment, the epoxy resin oligomer forms a polymer having a molecular weight between about 40000 and 100000 after the in-situ polymerization is performed. Specifically, as described above, since the epoxy resin oligomer in any of the above embodiments is a thermoplastic epoxy resin oligomer, the polymer formed by polymerization is also a thermoplastic polymer.

Moreover, since the epoxy resin oligomer is a solid at room temperature, before in-situ polymerization is performed, the epoxy resin oligomer can be crushed into powder to obtain a powdered epoxy resin oligomer having a more uniform molecular weight distribution, wherein the crushing method includes, for instance, crushing using a pulverizer, grinder, or a shredder In this way, when the powdered epoxy resin oligomer is used to perform in-situ polymerization, the resulting polymer can have a more uniform molecular weight distribution, thus solving the known issue of difficult control of the molecular weight distribution of in-situ polymerization.

From another perspective, since the epoxy resin oligomer can be used in powder form, the epoxy resin oligomer can be coated on fiber via an electrostatic spraying method when in-situ polymerization is performed. In other words, the epoxy resin oligomer of the invention can adopt an existing powder impregnation process to perform the manufacture of the composite material.

Moreover, since the epoxy resin oligomer has reactivity, the viscosity thereof is rapidly increased after the viscosity thereof is significantly reduced at high temperature. Accordingly, the Inventors discovered that by coating the powdered epoxy resin oligomer on a fiber after preheating the fiber at 100° C. to 160° C., the impregnation time can be controlled to within 1 minute, and excellent impregnation effect can be achieved.

The features of the invention are more specifically described in the following with reference to example 1 to example 4 and comparative example 1. Although the following examples are described, the materials used and the amount and ratio thereof, as well as handling details and handling process . . . etc., can be suitably modified without exceeding the scope of the invention. Accordingly, restrictive interpretation should not be made to the invention based on the examples described below.

EXAMPLE 1

Preparation of Epoxy Resin Oligomer

At room temperature, 50 g (0.135 mole) of BE-188 epoxy resin (made by Changchun Chemical Company) and 13.2 g (0.150 mole) of cyclohexylamine were added in a 100 ml round-bottomed reaction flask. Then, at room temperature, the mixture was sufficiently stirred and mixed to react for 6 hours to obtain the epoxy resin oligomer of example 1 in the form of brittle solid, wherein the molecular weight was 5000±500.

Preparation of Composite Material

First, 20 g of the epoxy resin oligomer of example 1 was crushed into powder using a grinder (product name: RT-04A, made by Rong Tsong Precision Technology Co.). Then, a carbon fiber (model: 3K woven; made by Tairyfil, Formosa Plastic Group; fiber areal weight (FAW): 200 g/m$^2$) having length and width dimensions of 30 cm×30 cm was taken and preheated on a 160° C. heating plate for 5 minutes. Then, the resulting powder was uniformly coated on the carbon fiber, and the temperature was maintained for 10 minutes, wherein the powder was melted within 1 second to 5 seconds and impregnated into the carbon fiber. Then, the temperature was lowered to room temperature to obtain the composite material of example 1, wherein the molecular weight of the polymer was within 40000 to 60000.

EXAMPLE 2

Preparation of Epoxy Resin Oligomer

At room temperature, 50 g (0.135 mole) of BE-188 epoxy resin (made by Changchun Chemical Company) and 16.2 g (0.134 mole) of 3,4-dimethylaniline were added in a 100 ml round-bottomed reaction flask. Then, the mixture was sufficiently stirred and mixed to perform a reaction for 24 hours to obtain the epoxy resin oligomer of example 2 in the form of brittle solid, wherein the molecular weight was 5000±500.

Preparation of Composite Material

First, 20 g of the epoxy resin oligomer of example 2 was crushed into powder using a grinder (product name: RT-04A, made by Rong Tsong Precision Technology Co.). Then, a carbon fiber (model: 3K woven; made by Tairyfil, Formosa Plastic Group; FAW: 200 g/m$^2$) having length and width dimensions of 30 cm×30 cm was taken and preheated on a 160° C. heating plate for 5 minutes. Then, the resulting powder was uniformly coated on the carbon fiber, and the temperature was maintained for 1 hour, wherein the powder was melted within 1 second to 5 seconds and impregnated into the carbon fiber. Then, the temperature was lowered to room temperature to obtain the composite material of example 2, wherein the molecular weight of the polymer was within 70000 to 100000.

EXAMPLE 3

Preparation of Epoxy Resin Oligomer

At room temperature, 50 g (0.135 mole) of BE-188 epoxy resin (made by Changchun Chemical Company) and 30.5 g (0.134 mole) of bisphenol A were added in a 100 ml round-bottomed reaction flask. Then, the temperature was increased to 120° C., and stirring was continuously performed for half an hour until the bisphenol A was completely dissolved. Then, the resulting mixture was cooled to 60° C., then 0.1 g tetramethylammonium hydroxide was added, and then stirring was continuously performed for half an hour. Then, the temperature was lowered to room temperature, and after the mixture was left to stand for 24 hours, the epoxy resin oligomer of example 3 was obtained, wherein the molecular weight was 8000±500.

Preparation of Composite Material

First, 20 g of the epoxy resin oligomer of example 3 was crushed into powder using a grinder (product name: RT-04A, made by Rong Tsong Precision Technology Co.). Then, a carbon fiber (model: 3K woven; made by Tairyfil, Formosa Plastic Group; FAW: 200 g/m$^2$) having length and width dimensions of 30 cm×30 cm was taken and preheated on a 160° C. heating plate for 5 minutes. Then, the resulting powder was uniformly coated on the carbon fiber, and the temperature was maintained for 1 hour, wherein the powder was melted within 2 seconds to 10 seconds and impregnated into the carbon fiber. Then, the temperature was lowered to room temperature to obtain the composite material of example 3, wherein the molecular weight of the polymer was within 40000 to 60000.

EXAMPLE 4

Preparation of Composite Material

First, 14.73 g of the epoxy resin oligomer of example 1 was crushed into powder using a grinder (product name: RT-04A, made by Rong Tsong Precision Technology Co.). Then, a uniaxial carbon fiber (model: Tairyfil TC-35R; made by Tairyfil, Formosa Plastic Group; FAW=200 g/m$^2$) having length and width dimensions of 30 cm×30 cm was taken and preheated on a 160° C. heating plate for 5 minutes. Then, the resulting powder was uniformly coated on the carbon fiber, and the temperature was maintained for 5 minutes, wherein the powder was melted within 1 second to 5 seconds and impregnated into the carbon fiber. Then, the temperature was lowered to room temperature to obtain the composite material of example 4, wherein the resin content (RC) of the composite material was 45% and the molecular weight of the polymer was within 40000 to 60000.

COMPARATIVE EXAMPLE 1

Preparation of Composite Material

A thermosetting epoxy resin (model: 2552; made by SWancor Ind. Co., Ltd.) was impregnated in a uniaxial carbon fiber (model: Tairyfil TC-35R; made by Tairyfil, Formosa Plastic Group) having length and width dimensions of 30 cm×30 cm to obtain the composite material of comparative example 1, wherein the RC of the composite material was 45%.

Then, measurement of glass transition temperature was respectively performed on the composite materials of examples 1 to 4 and comparative example 1, measurements of 0° tensile strength, 0° tensile modulus, 0° flexural strength, 0° flexural modulus, and short beam shear strength were respectively performed on the composite materials of example 4 and comparative example 1, and measurements of 0° compressive strength and 0° compressive modulus were performed on the composite material of example 4. The above tests are as described below, and the test results are shown in Table 1.

Measurement of Glass Transition Temperature

First, the composite materials of examples 1 to 4 and comparative example 1 were respectively made into five test samples. Then, a differential scanning calorimeter (DSC) (made by TA Instruments, product name: DSC-Q20) was used to heat the test pieces from 20° C. to 150° C. under the conditions of a nitrogen gas atmosphere and a heating rate set to 10° C./min, and the temperature at which the loss tangent (tanδ) reached a maximum value was considered the glass transition temperature (° C.). In general, a greater numeric value of glass transition temperature means a better thermal stability.

Measurement of 0° Tensile Strength

First, the composite materials of example 4 and comparative example 1 were respectively made into five test pieces. Then, the 0° tensile strength of each of the five test pieces of example 4 and the five test pieces of comparative example 1 was measured according to the test specifications of ASTM D3039. In general, a greater numeric value of 0° tensile strength means a better mechanical strength.

Measurement of 0° Tensile Modulus

First, the composite materials of example 4 and comparative example 1 were respectively made into five test pieces. Then, the 0° tensile modulus of each of the five test pieces of example 4 and the five test pieces of comparative example 1 was measured according to the test specifications of ASTM D3039. In general, a greater numeric value of 0° tensile modulus means a better mechanical strength.

Measurement of 0° Flexural Strength

First, the composite materials of example 4 and comparative example 1 were respectively made into five test pieces. Then, the 0° flexural strength of each of the five test pieces of example 4 and the five test pieces of comparative example 1 was measured according to the test specifications of ASTM D790. In general, a greater numeric value of 0° flexural strength means a better mechanical strength.

Measurement of 0° Flexural Modulus

First, the composite materials of example 4 and comparative example 1 were respectively made into five test pieces. Then, the 0° flexural modulus of each of the five test pieces of example 4 and the five test pieces of comparative example 1 was measured according to the test specifications of ASTM D790. In general, a greater numeric value of 0° flexural modulus means a better mechanical strength.

Measurement of 0° Compressive Strength

First, the composite material of example 4 was made into five test pieces. Then, the 0° compressive strength of each of the five test pieces of example 4 was measured according to the test specifications of ASTM D3410. In general, a greater numeric value of 0° compressive strength means a better mechanical strength.

Measurement of 0° Compressive Modulus

First, the composite material of example 4 was made into five test pieces. Then, the 0° compressive modulus of each of the five test pieces of example 4 was measured according to the test specifications of ASTM D3410. In general, a greater numeric value of 0° compressive modulus means a better mechanical strength.

Measurement of Short Beam Shear Strength

First, the composite materials of example 4 and comparative example 1 were respectively made into five test pieces. Then, the short beam shear strength of each of the five test pieces of example 4 and the five test pieces of comparative example 1 was measured according to the test specifications of ASTM D2344. In general, a greater numeric value of short beam shear strength means a better mechanical strength.

TABLE 1

|  | Example 1 | Example 2 | Example 3 | Example 4 | Comparative example 1 |
|---|---|---|---|---|---|
| 0° tensile strength (MPa) | — | — | — | 1700 ± 80 | 2200 ± 100 |
| 0° tensile modulus (GPa) | — | — | — | 113 ± 5 | 125 ± 5 |
| 0° flexural strength (MPa) | — | — | — | 1032 ± 45 | 1100 ± 50 |
| 0° flexural modulus (GPa) | — | — | — | 100 ± 5 | 125 ± 5 |
| 0° compressive strength (MPa) | — | — | — | 645 ± 60 | — |
| 0° compressive modulus (GPa) | — | — | — | 122 ± 5 | — |
| Short beam shear strength (MPa) | — | — | — | 55 ± 3 | 85 ± 5 |
| Glass transition temperature (° C.) | 87 ± 1 | 98 ± 1 | 94 ± 2 | 87 ± 1 | 130 ± 2 |

It can be known from Table 1 that, the 0° tensile strength of the composite material of example 4 was about 77% of the 0° tensile strength of the composite material of comparative example 1; the 0° tensile modulus of the composite material of example 4 was about 90% of the 0° tensile modulus of the composite material of comparative example 1; the 0° flexural strength of the composite material of example 4 was about 94% of the 0° flexural strength of the composite material of comparative example 1; the 0° flexural modulus of the composite material of example 4 was about 80% of the 0° flexural modulus of the composite material of comparative example 1; and the short beam shear strength of the composite material of example 4 was about 65% of the short beam shear strength of the composite material of comparative example 1. The results show that, during the preparation of the composite materials via in-situ polymerization, the epoxy resin oligomer of example 4 can achieve good impregnation effect at a lower impregnation temperature.

Moreover, although measurements of 0° tensile strength, 0° tensile modulus, 0° flexural strength, 0° flexural modulus, 0° compressive strength, 0° compressive modulus, and short beam shear strength were not performed on the composite materials of examples 1 to 3, according to the measurement results of the composite materials of example 4 and comparative example 1, those having ordinary skill in the art should understand that the epoxy resin oligomers of examples 1 to 3 can also achieve good impregnation effect at a lower impregnation temperature, and therefore the composite materials of examples 1 to 3 also have good mechanical strength.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An epoxy resin oligomer obtained by a reaction of at least a first reactant and a second reactant, wherein a molecular weight of the epoxy resin oligomer is between 3000 and 8000, a mole ratio of the first reactant and the second reactant is between 1:0.9 and 0.9:1, each of the first reactant and the second reactant is a compound having two polymerizable groups, and the first reactant is a bifunctional epoxy resin selected from at least one of compounds represented by formula (1) to formula (3) below:

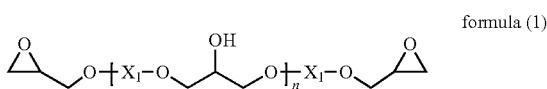

formula (1)

formula (2)

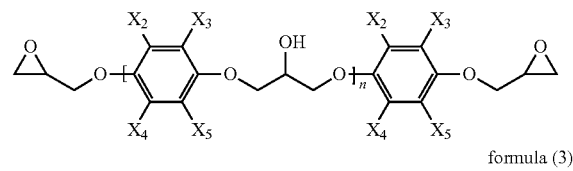

formula (3)

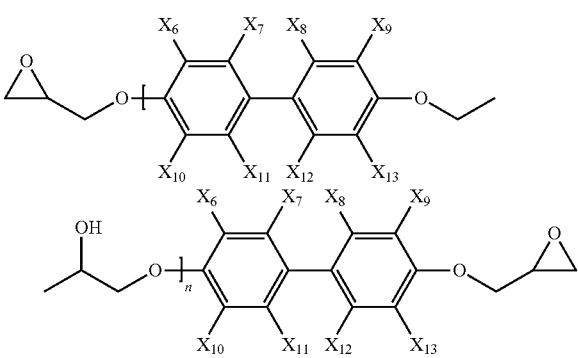

wherein $X_1$ is a C4 to C18 chain alkylene group; $X_2$ to $X_{13}$ are each independently a hydrogen atom, a phosphorus atom, a C1 to C18 chain alkyl group, or halogen; and n is 0 to 20.

2. The epoxy resin oligomer of claim 1, wherein the epoxy resin oligomer is a solid at room temperature.

3. The epoxy resin oligomer of claim 1, wherein the first reactant is a bifunctional epoxy resin, and the second reactant is an amine compound containing dual active hydrogen.

4. The epoxy resin oligomer of claim 3, wherein the first reactant is selected from at least one of compounds represented by formula (1) to formula (3) below:

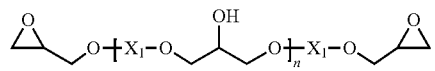

formula (1)

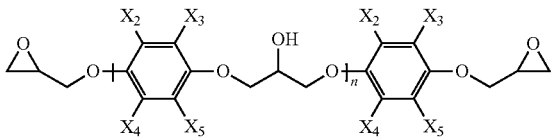

formula (2)

-continued

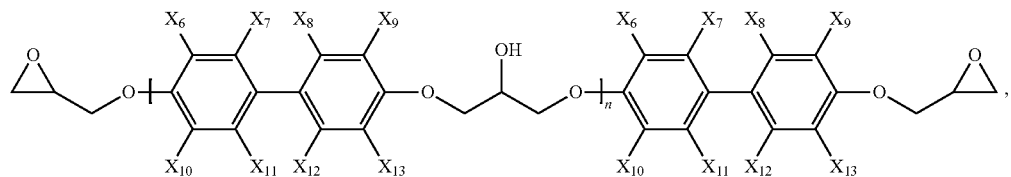

formula (3)

wherein $X_1$ is a C4 to C18 chain alkylene group; $X_2$ to $X_{13}$ are each independently a hydrogen atom, a phosphorus atom, a C1 to C18 chain alkyl group, or halogen; and n is 0 to 20.

5. The epoxy resin oligomer of claim 3, wherein an epoxy equivalent of the first reactant is between 150 g/mol and 1000 g/mol.

6. The epoxy resin oligomer of claim 3, wherein the second reactant is selected from at least one of compounds represented by formula (5) to formula (7) below:

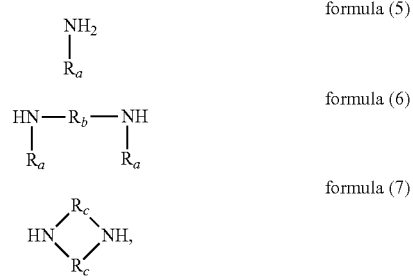

formula (5)

formula (6)

formula (7)

wherein $R_a$ is a C1 to C20 chain alkyl group, a C5 to C12 cycloalkyl group, a C6 to C18 aryl group, or a C6 to C20 aralkyl group; $R_b$ is a C1 to C20 chain alkylene group or a C6 to C12 arylene group; and $R_c$ is a C1 to C20 chain alkylene group.

7. The epoxy resin oligomer of claim 3, wherein the epoxy resin oligomer is obtained by a reaction of at least the first reactant, the second reactant, and an additive, wherein based on a total weight of the first reactant, the second reactant, and the additive, a usage amount of the additive is greater than 0 wt % and equal to or less than 5 wt %.

8. The epoxy resin oligomer of claim 7, wherein the additive comprises a UV-resistant agent, an anti-yellowing agent, a flame retardant, a toughener, a plasticizer, or an abrasion-resistant additive.

9. The epoxy resin oligomer of claim 1, wherein the epoxy resin oligomer is obtained by a reaction of at least the first reactant, the second reactant, and a catalyst, wherein the second reactant is a bisphenol compound, and based on a total weight of the first reactant, the second reactant, and the catalyst, a usage amount of the catalyst is 0.01 wt % to 3 wt %.

10. The epoxy resin oligomer of claim 9, wherein an epoxy equivalent of the first reactant is between 150 g/mol and 1000 g/mol.

11. The epoxy resin oligomer of claim 9, wherein the second reactant is selected from at least one of compounds represented by formula (8) to formula (9) below:

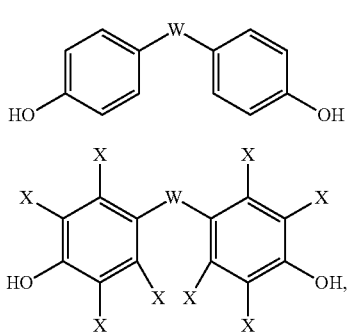

formula (8)

formula (9)

wherein W is a C1 to C20 chain alkylene group, a C5 to C12 chain cycloalkylene group, or a fluorenylene group, and X is a C1 to C20 chain alkyl group, a hydrogen atom, or halogen.

12. The epoxy resin oligomer of claim 9, wherein the catalyst comprises a Lewis base or an organic base.

13. The epoxy resin oligomer of claim 9, wherein the epoxy resin oligomer is obtained by a reaction of at least the first reactant, the second reactant, the catalyst, and an additive, wherein based on a total weight of the first reactant, the second reactant, the catalyst, and the additive, a usage amount of the additive is greater than 0 wt % and equal to or less than 5 wt %.

14. The epoxy resin oligomer of claim 13, wherein the additive comprises a UV-resistant agent, an anti-yellowing agent, a flame retardant, a toughener, a plasticizer, or an abrasion-resistant additive.

15. The epoxy resin oligomer of claim 1, wherein the second reactant includes a compound represented by formula (9) below:

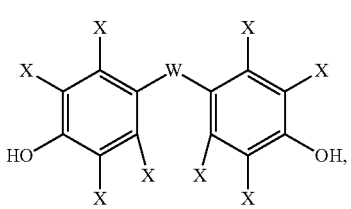

formula (9)

wherein W is a C1 to C20 chain alkylene group, a C5 to C12 chain cycloalkylene group, or a fluorenylene group, and X is a C1 to C20 chain alkyl group or halogen.

16. The epoxy resin oligomer of claim 1, wherein the first reactant is a bifunctional epoxy resin selected from a compound represented by formula (1).

* * * * *